INVENTOR.
JOHN ROBERT ANDERSON,
BY John M. Koch
ATTORNEY.

3,565,607
METHOD FOR REMOVING OXYGEN IMPURITIES FROM CESIUM
James E. Webb, Administrator of the National Aeronautics and Space Administration, with respect to an invention of John Robert Anderson, Malibu, Calif.
Continuation-in-part of application Ser. No. 459,596, May 28, 1965. This application Nov. 8, 1967, Ser. No. 684,894
Int. Cl. C22b 9/08, 27/00
U.S. Cl. 75—66
1 Claim

ABSTRACT OF THE DISCLOSURE

A method for purifying cesium of oxides contained therein comprising passing cesium vapor through a filter of porous tungsten heated to a temperature sufficient to cause dissociation of the oxides present, yet not so high as to ionize the cesium.

CROSS REFERENCE TO RELATED APPLICATION

Figure 2:
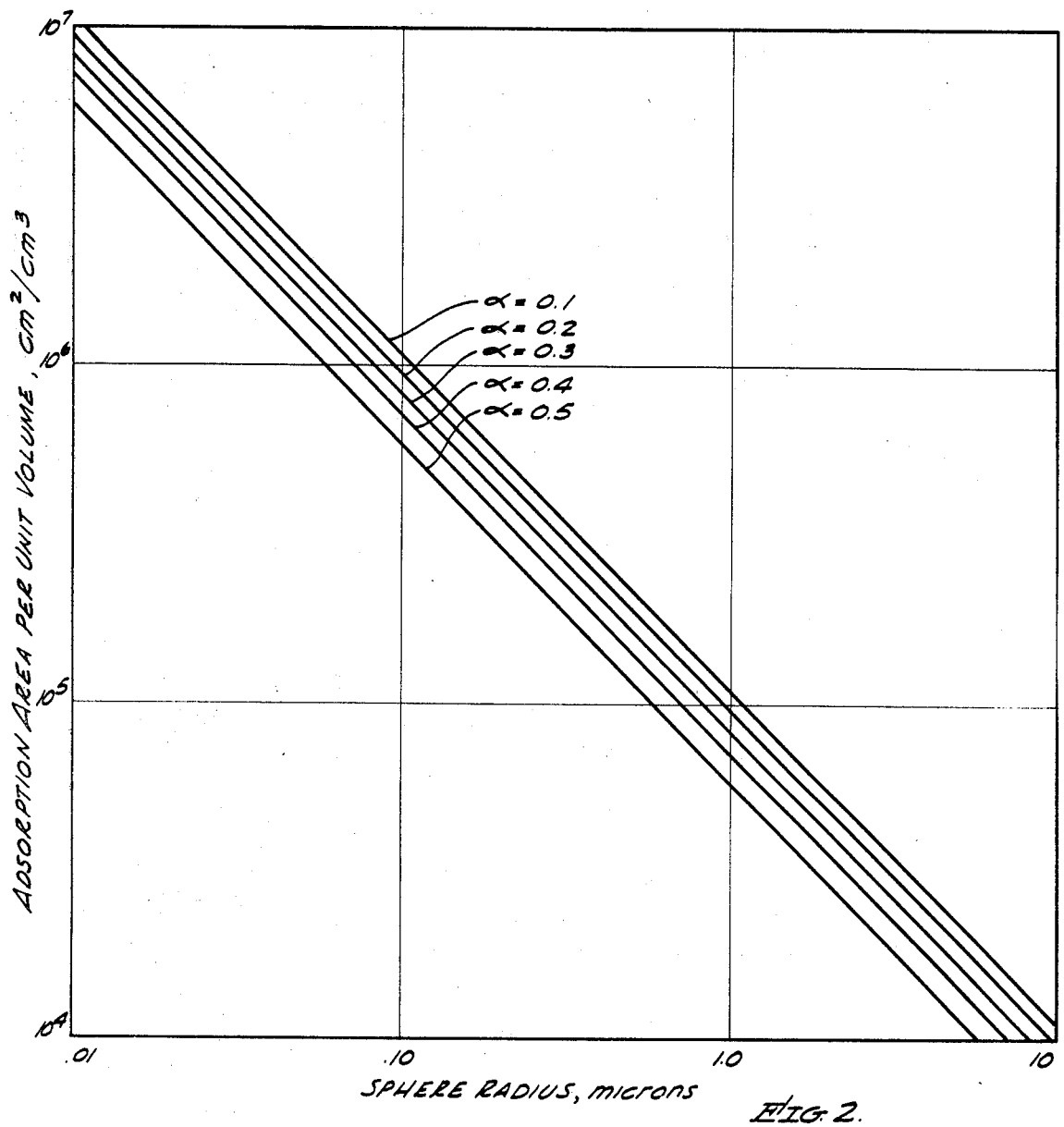

This application is a continuation-in-part of patent application Ser. No. 459,596, filed May 28, 1965, and now abandoned.

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435, 42 U.S.C. 2457).

BACKGROUND OF THE INVENTION

This invention relates to a method and filter or membrane for purifying cesium and particularly to a vapor phase method and filter member for removal of alkali metal oxides from cesium vapor.

Commercial grade cesium metal contains up to about one percent by weight of alkali metal impurities such as lithium, sodium, potassium and rubidium together with up to about three hundred parts per million of oxygen in the form of alkali metal oxides. Normal handling procedures can introduce additional oxygen. Vacuum distillation of commercial grade cesium reduces these impurities somewhat, principally sodium. Alkali metal oxides are very objectionable in cesium metal, particularly in the use of cesium metal in the vapor phase for the production of cesium ions, such as in its use in cesium ion beam devices, including ion rockets. For example, in an ion engine, the tungsten ionizer would be converted to a tungsten-oxide one due to the deposit of oxygen from the cesium. Considerably more work is required to ionize cesium with a tungsten oxide ionizer than with a tungsten one. Thus, it is particularly desirable to pass pure cesium through the ionizer.

Accordingly, it is a primary object of this invention to provide a method for the substantial elimination of oxygen or oxide impurities from cesium metal.

Additional objects of the invention will become apparent from the following description, which is given principally for purposes of illustration, and not limitation.

Stated in general terms, the objects of the invention are attained by passing the impure cesium, including oxygen, alkali metal oxides, other oxides such as oxides of carbon, nitrogen or hydrogen, or other metal oxides through a porous metal filter or membrane, preferably a porous tungsten filter or membrane, which is maintained at an elevated temperature sufficient to dissociate the oxide impurities in the cesium as it percolates or diffuses through the filter or membrane, and so that the dissociated oxygen is tightly adsorbed or absorbed on the surface, including the internal porous area, of the filter or membrane. The filter is maintained at a temperature below that at which ionization of the cesium occurs, so that pure cesium vapor will be available for use in a subsequent ionizer.

Though tungsten is most commonly used with cesium, the filter of this invention can additionally be made of zirconium-titanium alloys conventionally used for gettering gases. The remaining discussion, for purposes of illustration only, will, however, refer to the use of tungsten.

Figure 1:
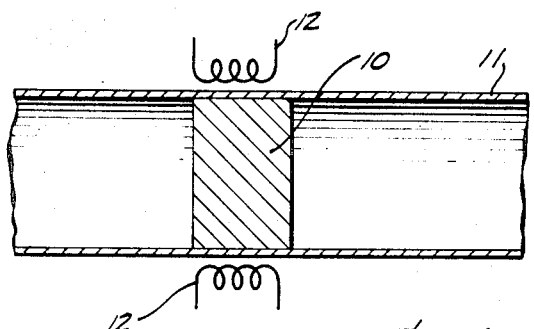

A more detailed description of a specific embodiment of the invention is given below with reference to the accompanying drawing, wherein:

FIG. 1 is a schematic vertical sectional view showing a conduit containing a heated filter or membrane mounted transversely therein for the purification of cesium liquid or vapor fed through the conduit; and FIG. 2 is a graph showing the relationship between the sphere radius in microns and the adsorption surface area of a cubic centimeter of porous tungsten at various volume densities.

The basic idea of a filter to remove oxygen from the cesium involves the principle of dissociation of oxides and adsorption or absorption of the oxygen atoms. Tungsten is well suited for this purpose. It has been determined that a monolayer of atoms of oxygen is held so strongly on the tungsten surface that it takes about three years at 1500° K. for half the monolayer to evaporate. Cesium and potassium oxides, particularly in the presence of tungsten, dissociate above about 600° K. The upper temperature limit at which ionization begins is 1000° K. Thus, the filter of this invention will operate between 600° K. and 1000° K.

Hence, in the purification of vacuum distilled cesium, the filter employed consists of a porous tungsten membrane 10 (FIG. 1) mounted across the flow path in conduit 11, heated to a temperature between about 600° K. and about 1000° K. by the use of an electric heater 12. Porous filter 10 is made to have sufficient total surface area, including internal porous area, so that the alkali metal oxides dissociate, and so that the dissociated oxygen is adsorbed or absorbed on the tungsten membrane 10, while the cesium and other alkali metal atoms flow through the porous membrane 10. The required total tungsten surface area can be estimated from knowledge of the oxygen impurity content of the cesium. This impurity is present, for example, to approximately 300 parts per million parts of pure cesium.

Consider the case of a 0.01 lb. thrust cesium-contact ion engine operating continuously for one year at a specific impulse of 6000 seconds. The total cesium weight required is about 24 kg. and the mass of a cesium atom is $2.2 \times 10^{-25}$ kg. The number of cesium atoms per year is about $1.1 \times 10^{26}$. The total oxygen content per year is about $5 \times 10^{21}$ atoms. The surface concentration of a monolayer of oxygen adatoms is approximately- $5 \times 10^{14}$ per cm.$^2$. Hence, we require a filter with a total filter adsorption area of about $10^7$ square centimeters.

The surface area $A_s$ of a spherical particle of radius $r_0$ is $$A_s = 4\pi r_0^2$$

The volume density per cube of spheres in a close-packed array is approximately:

$$\sigma = \frac{3(1-\alpha)}{4\pi r_0^3}$$

where $\alpha$ is the porosity of the filter.

Thus a porous filter of 1 cm. thickness by 1 cm.² cross-sectional area contains a total adsorption area of:

$$A = \sigma A_s = \frac{3(1-\alpha)}{r_0}$$

This relation is plotted in FIG. 2 for a range of sphere radii from 0.01 to 10 microns. For example, for the above ion engine application, a suitable filter for removal of oxygen from cesium was constructed from a pressed and sintered slab of sized spherical tungsten having a density of about 80 percent of the theoretical maximum and a particle radius of about 1.0 micron of an overall grain size of about 2.0 microns. The filter volume was approximately 100 cubic centimeters.

In general, when a solid porous filter is desired, the overall grain size of the spherical tungsten particles should range from about 1.0 or 2.0 to about 10.0 microns, preferably from about 0.8 or 1.0 to about 4.5 or 5.0 microns, and the density should range from about 75 to about 85 percent of the theoretical maximum.

The aforegoing discussion pertains to conventional powder metallurgy techniques for achieving a porous metal structure. The calculations demonstrate how one designs a filter which has a sufficient surface area to adsorb all of the oxygen present in the cesium. The actual construction of a given filter might be identical to that of a conventional ionizer if a sufficient area is present to adsorb the predicted contained oxygen in the cesium. However, this invention particularly relates to a different utilization of such a structure, whereby at a lower operating temperature, it can purify cesium without ionizing it. Additionally, it should be pointed out that because of the prior use of porous tungsten to serve as an ionizer, no particular consideration was given to controlling the available surface area of the material to provide a surface for a monolayer of oxygen atoms.

Though reference has been made to a solid porous structure, it should be readily apparent that such is not mandatory for a filter of this invention. The main requirement, as indicated, is to provide a sufficient surface area of filter material and heat that material to cause dissociation of the oxides without ionizing the cesium. This can easily be achieved by a filter in which the cesium flows through a permeable container having tungsten in loose powder form therein. The container could be heated by induction heating coils or like means so as to raise the particles therein to the desired temperature.

In the case of feeding liquid cesium, the cesium should be preheated to about 300° to about 400° K. and fed at a pressure in the range of from about .001 to about 1.0 p.s.i. through a filter maintained in the range of from about 600° to about 1000° K.

Similarly, in feeding cesium vapor, the cesium should be preheated to about 400° to about 800° K. and fed at a pressure in the range from about $2 \times 10^{-7}$ to about $2 \times 10^{-2}$ p.s.i. through a filter maintained in the range from about 600° to about 1000° K.

Examples of purification of cesium using this filter are given below:

EXAMPLE I

Vacuum distilled commercial grade cesium containing 200 parts per million of oxygen, largely in the form of alkali metal oxides, primarily cesium oxide, was passed, in the liquid phase, through a stainless steel conduit containing a pressed and sintered porous tungsten filter of 80 percent of the theoretical maximum density of sized spherical tungsten with a particle radius of about 2 microns or a grain size of about 4.0 microns. The filter was 2 cm. thick, had a cross-sectional area of 5 cm.² and was maintained at 650° K. A mass of 45 grams liquid cesium at 300° K. and .013 p.s.i. was passed through the filter at a rate of 0.6 gram per minute. The filtered liquid cesium has an oxygen content of 42±5 parts per million.

EXAMPLE II

Vacuum distilled commercial grade cesium containing 175 parts per million of oxygen, largely in the form of alkali metal oxides, primarily cesium oxide, was passed, in the vapor phase, through a stainless steel conduit containing a pressed and sintered porous tungsten filter of 80 percent of the theoretical maximum density of sized spherical tungsten with a particle radius of about 2 microns. The filter was 2 cm. thick, had a cross-sectional area of 5 cm.² and was maintained at 700° K. A mass of 10 grams of vaporized cesium at 573° K. and $3.3 \times 10^{-4}$ p.s.i. was passed through the filter at a rate of $1.8 \times 10^{-2}$ grams per minute. The filtered vaporized cesium had an oxygen content of 20±5 parts per million.

Although several specific examples of the method of removal of oxygen impurities of cesium have been described hereinabove, it will be understood that many modifications and variations of the present invention are possible in the light of the above teachings. It is therefore to be understood that, within the scope of the appended claim, the invention can be practiced otherwise than as specifically described.

What is claimed is:

1. A method for the removal of oxygen impurities from metallic cesium comprising:
   providing a porous tungsten filter with a total surface area sufficient to form a monolayer of oxygen atoms based upon the adsorption of all the predicted oxygen in a given amount of cesium to be passed through said filter,
   heating said filter to between 600 and 1000° K,
   passing vaporized cesium through said filter and recovering cesium of decreased oxygen content.

References Cited

UNITED STATES PATENTS

| 2,028,390 | 1/1936 | Hanson | 75—66 |
| 2,685,346 | 8/1954 | Deyrup et al. | 75—66X |
| 2,815,277 | 12/1957 | Bruggeman et al. | 75—66 |
| 3,159,967 | 12/1964 | Webb | 75—66X |
| 3,336,748 | 8/1967 | Nakanishi et al. | 60—202 |
| 3,371,489 | 3/1968 | Eckhardt | 60—202 |
| 3,465,522 | 9/1969 | Anderson et al. | 60—202 |

HENRY W. TARRING II, Primary Examiner

U.S. Cl. X.R.

60—36, 202